(12) United States Patent
Yang et al.

(10) Patent No.: US 11,037,301 B2
(45) Date of Patent: Jun. 15, 2021

(54) TARGET OBJECT DETECTION METHOD, READABLE STORAGE MEDIUM, AND ELECTRONIC DEVICE

(71) Applicant: NEUSOFT CORPORATION, Shenyang (CN)

(72) Inventors: Menghui Yang, Shenyang (CN); Michael Zhang, Shenyang (CN)

(73) Assignee: NEUSOFT CORPORATION, Shenyang (CN)

( * ) Notice: Subject to any disclaimer, the term of this patent is extended or adjusted under 35 U.S.C. 154(b) by 28 days.

(21) Appl. No.: 16/564,507

(22) Filed: Sep. 9, 2019

(65) Prior Publication Data

US 2020/0327677 A1    Oct. 15, 2020

(30) Foreign Application Priority Data

Apr. 10, 2019    (CN) .......................... 201910285913.5

(51) Int. Cl.
*G06K 9/00* (2006.01)
*G06T 7/20* (2017.01)

(52) U.S. Cl.
CPC ............ *G06T 7/20* (2013.01); *G06K 9/00791* (2013.01); *G06T 2207/30252* (2013.01)

(58) Field of Classification Search
CPC ............ G06T 7/20; G06T 2207/30252; G06K 9/00791; G06K 9/00758; G06K 9/00744
See application file for complete search history.

(56) References Cited

U.S. PATENT DOCUMENTS

| 10,176,683 | B2 * | 1/2019 | Meganathan | .... G08B 13/19602 |
| 2008/0231564 | A1 * | 9/2008 | Harada | .................... G06F 3/042 345/81 |
| 2011/0158475 | A1 * | 6/2011 | Otani | ..................... G01C 11/30 382/103 |
| 2013/0194438 | A1 * | 8/2013 | Sweet, III | ............... G06F 3/005 348/207.1 |
| 2013/0201344 | A1 * | 8/2013 | Sweet, III | .......... H04N 1/00336 348/169 |

(Continued)

FOREIGN PATENT DOCUMENTS

| CN | 108307116 A | 7/2018 |
| CN | 108596955 A | 9/2018 |

OTHER PUBLICATIONS

Office Action for corresponding Chinese Patent Application No. 201910285913.5, dated Sep. 25, 2020.

*Primary Examiner* — Carol Wang
(74) *Attorney, Agent, or Firm* — Myers Wolin, LLC

(57) ABSTRACT

The present disclosure relates to a target object detection method, a readable storage medium and an electronic device. The method is periodically executed and the method includes: identifying a target object based on first N frames of image data obtained within a current execution period, wherein N is a positive integer, and N is less than the total number of frames of image data that can be obtained within the current execution period; and if the target object is identified, tracking the target object based on the obtained image data within the remaining time period of the current execution period. In the above technical solution, when the target object is identified, the identified target object is tracked within the remaining time period of the current execution period, so that the data calculation amount can be effectively reduced.

12 Claims, 4 Drawing Sheets

(56) References Cited

U.S. PATENT DOCUMENTS

| | | | |
|---|---|---|---|
| 2016/0063344 A1* | 3/2016 | Fan | G06T 7/246 |
| | | | 382/103 |
| 2017/0053409 A1* | 2/2017 | Yamamoto | G06K 9/00362 |
| 2018/0213166 A1* | 7/2018 | Kim | H04N 5/3532 |
| 2020/0042010 A1* | 2/2020 | Nakajima | G05D 1/0246 |

* cited by examiner

TARGET OBJECT DETECTION METHOD, READABLE STORAGE MEDIUM, AND ELECTRONIC DEVICE

CROSS REFERENCE TO RELATED APPLICATIONS

The present application claims the benefit of Chinese patent application No. 201910285913.5 filed on Apr. 10, 2019. The entire contents of the above-cited application are hereby incorporated by reference in their entirety for all purposes.

TECHNICAL FIELD

The present disclosure relates to detection technical field, and in particular, to a target object detection method, a readable storage medium, and an electronic device.

BACKGROUND

With the development of science and technology, the automatic driving and assisted driving technology came into being. Detecting a target object in a driving environment is a crucial step, which can provide a basis for determining a driving strategy. In the prior art, a video of a surrounding environment is generally obtained, and image identification is performed on each video frame in the video to identify a target object, so that the location and other related information of the target object can be determined. However, in the above process, the image identification needs to be performed on each video frame, resulting in a greater data calculation amount and worse real-time performance.

SUMMARY

An objective of the present disclosure is to provide a target object detection method, a readable storage medium, and an electronic device, which can effectively reduce the data calculation amount and effectively improve the real-time performance.

In order to achieve the above objective, according to a first aspect of the present disclosure, a target object detection method is provided, including:

identifying a target object based on first N frames of image data obtained within a current execution period, wherein N is a positive integer, and N is less than the total number of frames of image data that can be obtained within the current execution period; and if the target object is identified, tracking the target object based on the obtained image data within the remaining time period of the current execution period.

Optionally, the method further includes:

if the target object is not identified, entering a sleep state until the termination of the current execution period.

Optionally, the method further includes:

in the process of tracking the target object based on the obtained image data, if tracking failure occurs, entering the sleep state until the termination of the current execution period.

Optionally, N=1.

Optionally, the time length of the execution period is determined in the following manner:

the greater the moving speed of a collection apparatus of the image data is, the shorter the time length of the execution period is.

Optionally, the method is applied to an embedded platform.

According to a second aspect of the present disclosure, a computer readable storage medium is provided, wherein a computer program is stored thereon, and the program implements the steps of any one of the methods of the first aspect described above when being executed by a processor.

According to a third aspect of the present disclosure, an electronic device is provided, including:

a memory, wherein a computer program is stored thereon; and a processor, configured to execute the computer program in the memory to implement the steps of any one of the methods of the first aspect described above.

In the above technical solution, only the first N frames of image data participate in the calculation process of the target object identification within the current execution period, when the target object is identified, the identified target object is tracked within the remaining time period of the current execution period, so that the data calculation amount can be effectively reduced, and the use range of the target object detection method can be broadened. Moreover, since the image data within one execution period are basically similar, by tracking the target data, the detection accuracy of the target object can be ensured while ensuring the detection instantaneity of the target object. Moreover, the method provided in the present disclosure is periodically executed, and the target object can be re-identified at the beginning of each execution period, and a new target object can also be found in real time, thereby further improving the tracking accuracy of the target object, and improving the detection accuracy of the target object.

Other features and advantages of the present disclosure will be described in detail in the detailed description below.

BRIEF DESCRIPTION OF THE DRAWINGS

The drawings are used for providing a further understanding of the present disclosure and constitute a part of the specification. The drawings, together with the following specific embodiments, are used for explaining the present disclosure, but are not intended to limit the present disclosure. In the drawings.

DETAILED DESCRIPTION

The specific embodiments of the present disclosure will be described in detail below with reference to the drawings. It should be understood that the specific embodiments described herein are merely used for illustrating and explaining the present disclosure, rather than limiting the present disclosure.

Figure 1:
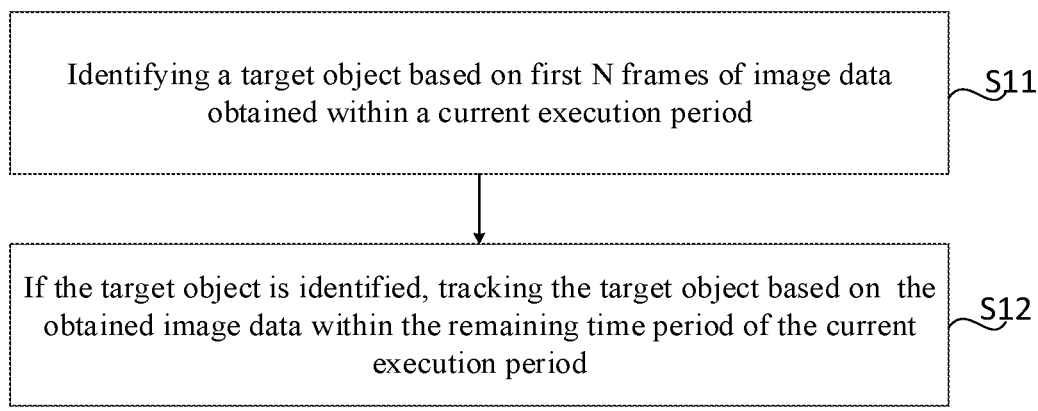
FIG. 1 is a flow chart of a target object detection method provided by an embodiment of the present disclosure.

As shown in FIG. 1, it is a flow chart of a target object detection method provided by an embodiment of the present disclosure, the method is periodically executed, and as shown in FIG. 1, the method may include:

In S11, a target object is identified based on the first N frames of image data obtained within a current execution period, wherein N is a positive integer, and the N is less than the total number of frames of image data that can be obtained within the current execution period.

Exemplarily, the method can be applied to a variety of fields, such as traffic, monitoring, and the like. When the method is applied to the traffic field, the target object can be pedestrian(s), vehicle(s) or traffic sign(s) and the like; and when the method is applied to the monitoring field, the target object can be pedestrian(s), animal(s) and the like. The above embodiments are merely illustrative and are not intended to limit the present disclosure. For example, the target object can also be other objects with shapes and boundaries.

In S12, if the target object is identified, the target object is tracked based on the obtained image data within the remaining time period of the current execution period.

The remaining time period of the current execution period is a time period from the moment when the target object is identified to the termination of the current execution period.

The identified target object can be tracked by using a tracking algorithm, for example, the MOSSE (Minimum Output Sum of Squared Error) algorithm, wherein when the target object is tracked based on the MOSSE algorithm, the frames per second is usually greater than 1000, therefore, for typical universal 30 FPS (Frames Per Second) image data (for example, video streams), the corresponding image data are substantially the same within a relatively short period of time, therefore the tracking accuracy of the target object can be effectively guaranteed. It should be noted that the MOSSE algorithm is the prior art and thus is not described here again.

In the above technical solution, only the first N frames of image data participate in the calculation process of the target object identification within the current execution period, when the target object is identified, the identified target object is tracked within the remaining time period of the current execution period, so that the data calculation amount can be effectively reduced, and the use range of the target object detection method can be broadened. Moreover, since the image data within one execution period are basically similar, by tracking the target data, the detection accuracy of the target object can be ensured while ensuring the detection instantaneity of the target object. Moreover, the method provided in the present disclosure is periodically executed, and the target object can be re-identified at the beginning of each execution period, and a new target object can also be found in real time, thereby further improving the tracking accuracy of the target object, and improving the detection accuracy of the target object.

In order to make it easier for those skilled in the art to understand the technical solutions provided by the embodiments of the present disclosure, each step in the above method is firstly described in detail below.

Optionally, N=1, that is to say, when the target object is identified based on the first N frames of image data obtained within the current execution period, the target object can be identified only based on the first frame image obtained within the current execution period, therefore the data calculation amount can be further reduced, the waste of resources caused by the target object detection can be avoided, and the instantaneity of the target object detection can be improved.

A target object identification model can be pre-trained, and the target object identification model is used for identifying the target object in the input image data. For example, the target object identification model can be trained by using a deep learning method, for example, the target object can be detected by an SSD (Single Shot MultiBox Detector) algorithm or a YOLO (You Only Look Once) algorithm. Exemplarily, a training image of the target object identification model can be marked according to the application scenario of the target object detection method. For example, when the target object detection method is applied to the traffic field, pedestrians, vehicles, traffic signs and the like in the training image can be marked, the number of training images can be set based on the accuracy of the target object identification model, and the higher the precision requirements of the target object identification model is, the greater the number of the training images can be set. The manner for training the model in the deep learning manner is the prior art and thus is not described herein again.

Therefore, after the target object identification model is pre-trained, only the first frame image needs to be input to the target object identification model, and then the target object in the image can be quickly and accurately identified, thereby effectively ensuring accuracy of target object identification, but also ensuring the efficiency of the target object identification and improving the instantaneity of the target object detection method.

When N is greater than 1, the identifying the target object based on the first N frames of image data obtained within the current execution period includes:

inputting a target image to the target object identification model, wherein the target image is initially the first frame image obtained within the current execution period;

if the target object is identified based on the target image, a step 12 can be directly executed; and if the target object is not identified based on the target image, using the next frame image as the target image, and inputting the target image to the target object identification model, until the target object is identified or the first N frame images are input to the target object identification model.

N can be set according to the actual usage scenario. Exemplarily, when N is 3, the first frame image obtained within the current execution period is input as the target image to the target object identification model, if the target object is not identified based on the target image, the next frame image (at this time, it is a second frame image) obtained within the current execution period is input as the target image to the target object identification model again, if the target object is identified based on the target image, the step 12 is executed, if the target object is not identified based on the target image, the next frame image (at this time, it is a third frame image) obtained within the current execution period is input as the target image to the target object identification model again, if the target object is identified based on the target image, the step 12 is executed, if the target object is not identified based on the target image, the first three frame images are all input to the target object identification model, and this time, it can be determined that the target object is not identified within the current execution period.

Therefore, by means of the above technical solution, the target object of the current execution period can be identified, and when the target object is identified, the target object is directly tracked, thereby effectively reducing the data calculation amount required for identifying the target object within the current execution period, and furthermore, the target object is detected via multiple frame images, the detection accuracy of the target object can also be effectively ensured.

Figure 2:
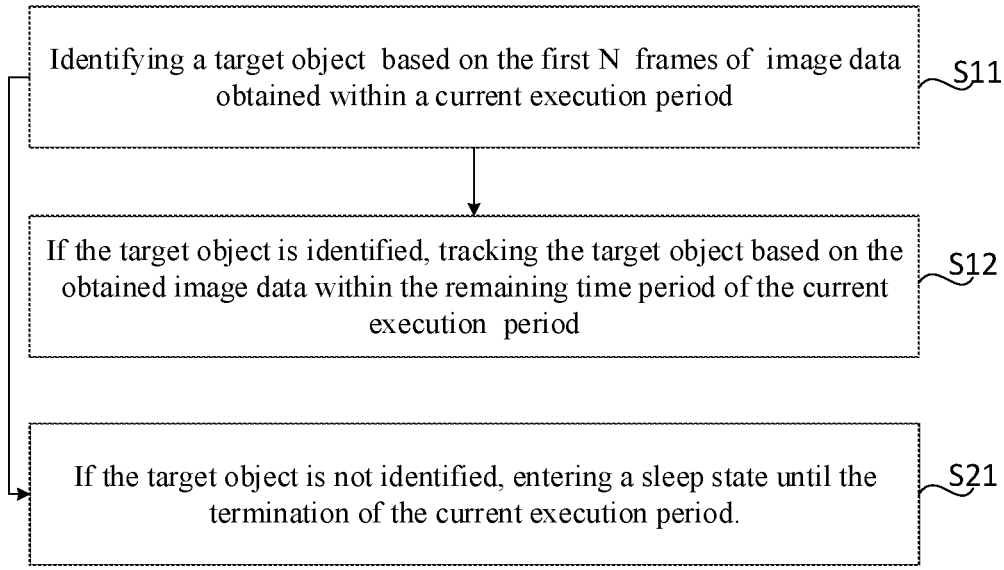
FIG. 2 is a flow chart of a target object detection method provided by another embodiment of the present disclosure.

Optionally, as shown in FIG. 2, it is a flow chart of a target object detection method provided by another embodiment of the present disclosure, and as shown in FIG. 2, the method further includes:

In S21, if the target object is not identified, entering a sleep state until the termination of the current execution period.

The time length of the execution period is generally short. Optionally, the time length of the execution period is determined in the following manner: the greater the moving speed of a collection apparatus of the image data is, the shorter the time length of the execution period is. For example, taking a vehicle-mounted system as an example, the collection apparatus of the image data can be a camera apparatus installed on the vehicle, and the moving speed thereof is the moving speed of the current vehicle. For example, for the image data of 30 FPS, the time length range of the execution period can be [0.33 S, 3 S]. For example, when the current moving speed is greater, the time length of the execution period can be set as 0.5 S, and when the moving speed of the current vehicle is smaller, the time length of the execution period can be set as 2 S. It should be noted that the foregoing description is only exemplary illustration, and the time length of the execution period can be set according to the actual usage scenario, which is not limited in the present disclosure.

In the present embodiment, if the target object is not identified, there are two possible situations as follows:

1) there is no target object needing to be identified in the first N frames of image data obtained within the current execution period; and 2) the target object exists in the first N frames of image data obtained within the current execution period, but has not been identified yet.

Since the time length of the execution period is short, and the target object detection method provided by the present disclosure is periodically executed, for both situations 1) and 2) mentioned above, the sleep state can be enter when the target object is not identified, that is, it is unnecessary to perform a corresponding operation within the current execution period, and the method is executed again until within the next execution period. Therefore, by adoption of the above technical solution, when the target object is not identified, the sleep state is entered, so that the waste of resources caused by unnecessary calculation can be effectively avoided, and the method can be re-executed until the arrival of the next execution period, thereby ensuring the instantaneity of the target object detection and guaranteeing the user experience.

Figure 3:
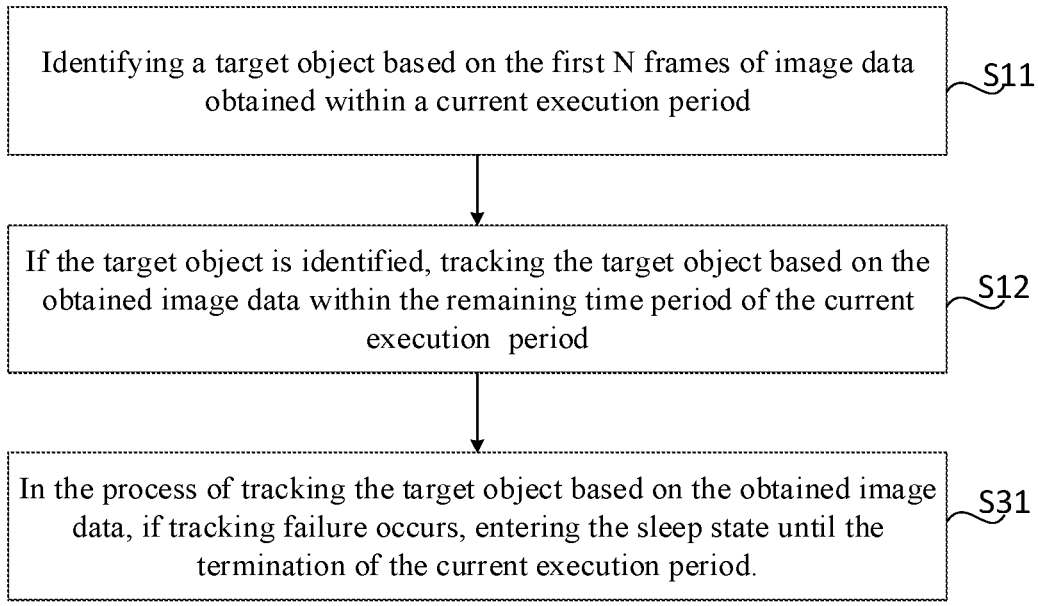
FIG. 3 is a flow chart of a target object detection method provided by another embodiment of the present disclosure.

Optionally, as shown in FIG. 3, it is a flow chart of a target object detection method provided by another embodiment of the present disclosure, and as shown in FIG. 3, the method further includes:

In S31, in the process of tracking the target object based on the obtained image data, if tracking failure occurs, entering the sleep state until the termination of the current execution period.

As described above, if the target object is identified within the current execution period, the target object is tracked based on the obtained image data within the remaining time period of the current execution period. However, the target object may leave the field of view corresponding to the image data within the current execution period, and at this time, the tracking failure can be determined. In addition, the tracking algorithm itself may also be unable to track the target object, and at this time, the tracking failure can also be determined.

Within the current execution period, when the tracking failure occurs in the process of tracking the target object, the sleep state is entered, and the method is re-executed until the arrival of the next execution period. Since the execution period is relatively short, when the sleep state is entered in the case of the tracking failure, no obvious delay occurs during the target object detection, the calculation resources can be saved, and the resource utilization rate can be improved.

In addition, in the method, by performing target object identification on a part of image data within the current execution period, the data calculation amount can be effectively reduced, so that the target object detection method can be applied to a system having high instantaneity requirements with relatively insufficient calculating capability. Optionally, the method can be applied to an embedded platform. By this approach, the calculation load can be effectively reduced, so that the phenomenon that the performance of an embedded system is seriously degraded due to the high calculation amount required when the method in the prior art is directly applied to the embedded platform can be avoided, and the stability of the embedded system can be ensured, the use range of the method is effectively broadened accordingly.

Figure 4:
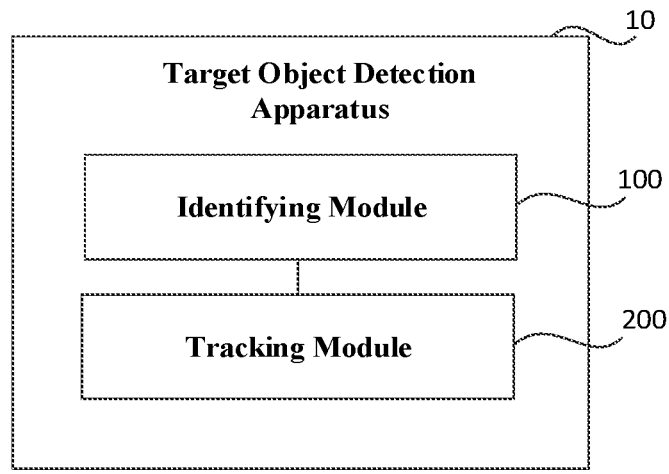
FIG. 4 is a block diagram of a target object detection apparatus provided by an embodiment of the present disclosure.

The present disclosure further provides a target object detection apparatus, as shown in FIG. 4, the apparatus 10 including:

an identifying module 100, configured to identify a target object based on the first N frames of image data obtained within a current execution period, wherein N is a positive integer, and N is less than the total number of frames of image data that can be obtained within the current execution period; and a tracking module 200 configured to, if the target object is identified, track the target object based on the obtained image data within the remaining time period of the current execution period.

Optionally, the tracking module is further configured to:
if the target object is not identified, enter a sleep state until the termination of the current execution period.

Optionally, the tracking module is further configured to:
in the process of tracking the target object based on the obtained image data, if tracking failure occurs, enter the sleep state until the termination of the current execution period.

Optionally, N=1.

Optionally, the time length of the execution period is determined in the following manner:
the greater the moving speed of a collection apparatus of the image data is, the shorter the time length of the execution period is.

Optionally, the method is applied to an embedded platform.

With regard to the apparatus in the above embodiment, the specific manners of the various modules to execute operations have been described in detail in the embodiment relating to the method, and thus are not explained in detail herein.

Figure 5:
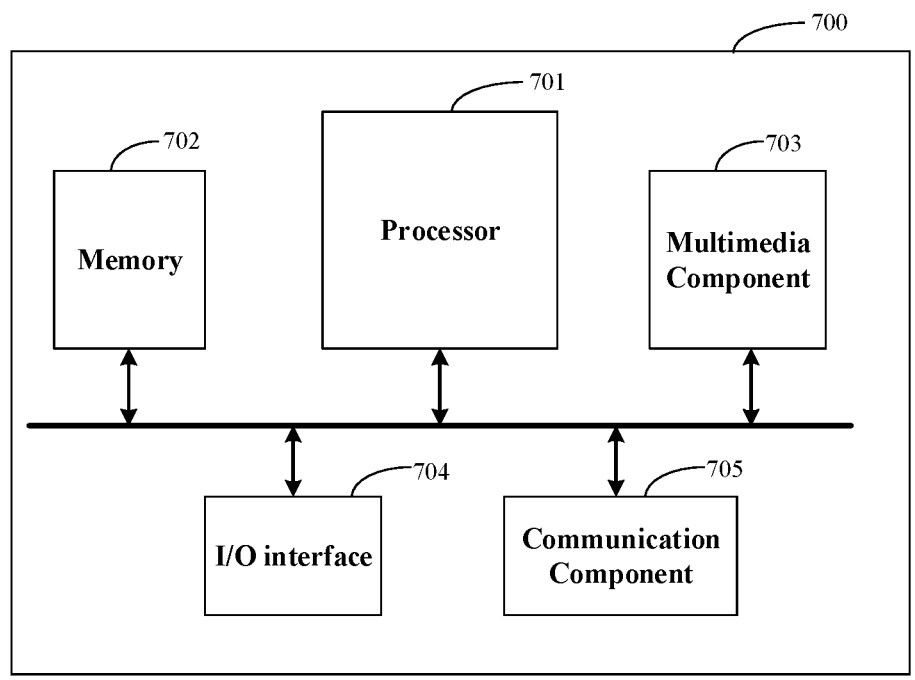
FIG. 5 is a block diagram of an electronic device shown according to an exemplary embodiment.

FIG. 5 is a block diagram of an electronic device 700 shown according to an exemplary embodiment. As shown in FIG. 5, the electronic device 700 may include a processor 701 and a memory 702. The electronic device 700 may also include one or more of a multimedia component 703, an input/output (I/O) interface 704 and a communication component 705.

The processor 701 is configured to control the overall operation of the electronic device 700 to complete all or a part of steps in the foregoing target object detection method. The memory 702 is configured to store various types of data to support operations at the electronic device 700, for example, these data may include instructions for operating any application program or method on the electronic device 700, and related data of the application program, for example, contact data, sent and received messages, pictures, audio, videos, and so on. The memory 702 can be implemented by any type of volatile or non-volatile storage device or a combination thereof, such as a Static Random Access Memory (referred to as SRAM), an Electrically Erasable Programmable Read-Only Memory (referred to as EEPROM), an Erasable Programmable Read-Only Memory (referred to as EPROM), a Programmable Read-Only Memory (referred to as PROM), a Read-Only Memory (referred to as ROM), a magnetic memory, a flash memory, a magnetic disk or an optical disk. The multimedia component 703 may include a screen and an audio component. The screen can be, for example, a touch screen, and the audio component is configured to output and/or input an audio signal. For example, the audio component may include a microphone for receiving an external audio signal. The received audio signal can be further stored in the memory 702 or sent by the communication component 705. The audio component further includes at least one loudspeaker for outputting the audio signal. The I/O interface 704 provides an interface between the processor 701 and other interface modules. The other interface modules can be keyboards, mice, buttons, and the like. These buttons may be virtual buttons or physical buttons. The communication component 705 is used for wired or wireless communication between the electronic device 700 and other devices. The wireless communication includes, such as Wi-Fi, Bluetooth, Near Field Communication (referred to as NFC), 2G, 3G, 4G, NB-IOT, eMTC, or other 5G and the like, or the combination of one or more of them, and it is not limited herein. Therefore, the corresponding communication component 705 may include: a Wi-Fi module, a Bluetooth module, an NFC module, and the like.

In an exemplary embodiment, the electronic device 700 may be implemented by one or more Application Specific Integrated Circuits (referred to as ASICs), Digital Signal Processor (referred to as DSP), Digital Signal Processing Device (referred to as DSPD), Programmable Logic Device (referred to as PLD), Field Programmable Gate Array (referred to as FPGA), controllers, microcontrollers, microprocessors or other electronic components, and is configured to execute the target object detection method described above.

In another exemplary embodiment, a computer readable storage medium including program instructions is further provided, and the program instructions implement the steps of the target object detection method described above when being executed by the processor. For example, the computer readable storage medium can be the above memory 702 including the program instructions, and the program instructions can be executed by the processor 701 of the electronic device 700 to complete the target object detection method described above.

In another exemplary embodiment, a computer program product is further provided, the computer program product includes a computer program executable by a programmable apparatus, and the computer program has a code portion for executing the target object detection method described above when being executed by the programmable apparatus.

Figure 6:
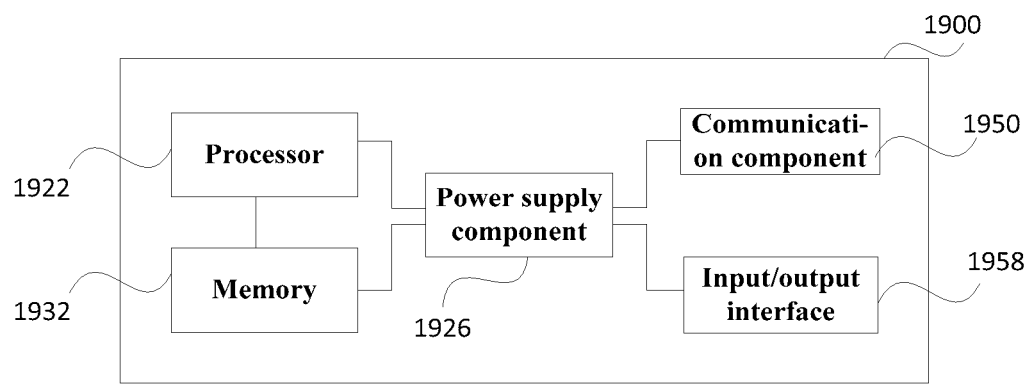
FIG. 6 is a block diagram of an electronic device shown according to an exemplary embodiment.

FIG. 6 is a block diagram of an electronic device 1900 shown according to an exemplary embodiment. For example, electronic device 1900 can be provided as a server. Referring to FIG. 6, the electronic device 1900 includes a processor 1922, which may be one or more, and a memory 1932 for storing a computer program executed by the processor 1922. The computer program stored in the memory 1932 may include one or more modules, wherein each corresponds to a group of instructions. In addition, the processor 1922 can be configured to execute the computer program to execute the target object detection method described above.

Additionally, the electronic device 1900 may further include a power supply component 1926 and a communication component 1950, the power supply component 1926 may be configured to execute power supply management of the electronic device 1900, and the communication component 1950 may be configured to achieve the communication of the electronic device 1900, for example, wired or wireless communication. Additionally, the electronic device 1900 may further include an input/output (I/O) interface 1958. The electronic device 1900 can operate an operating system stored in the memory 1932, such as Windows Server™, Mac OS X™, Unix™, Linux™, and the like.

In another exemplary embodiment, a computer readable storage medium including program instructions are further provided, and the program instructions implement the steps of the target object detection method described above when being executed by the processor. For example, the computer readable storage medium can be the above memory 1932 including the program instructions, and the program instructions can be executed by the processor 1922 of the electronic device 1900 to complete the target object detection method described above.

In another exemplary embodiment, a computer program product is further provided, the computer program product includes a computer program executable by a programmable apparatus, and the computer program has a code portion for executing the target object detection method described above when being executed by the programmable apparatus.

The preferred embodiments of the present disclosure have been described in detail above with reference to the drawings. However, the present disclosure is not limited to the specific details in the above embodiments, various simple modifications can be made to the technical solutions of the present disclosure within the scope of the technical concept of the present disclosure, and these simple variations are all within the protection scope of the present disclosure.

It should be further noted that the specific technical features described in the above specific embodiments can be combined in any suitable manner without contradiction. In order to avoid unnecessary repetition, various possible combinations are not additionally illustrated in the present disclosure.

In addition, various different embodiments of the present disclosure can be randomly combined, and the combinations should also be regarded as the contents disclosed by the present disclosure as long as not deviating from the spirit of the present disclosure.

What is claimed is:

1. A target object detection method comprising:
    identifying a target object based on first N frames of image data obtained within a current execution period, wherein N is a positive integer, and N is less than the total number of frames of image data that can be obtained within the current execution period; and if the target object is identified, tracking the target object based on the obtained image data within the remaining time period of the current execution period; and in the process of tracking the target object based on the obtained image data, if tracking failure occurs, entering a sleep state until a termination of the current execution period;

wherein the target object detection method is periodically executed.

2. The method according to claim 1, wherein N=1.

3. The method according to claim 1, wherein a time length of the current execution period is determined in the following manner:

the greater a moving speed of a collection apparatus of the obtained image data is, the shorter the time length of the current execution period is.

4. The method according to claim 1, wherein the method is applied to an embedded platform.

5. A non-transitory computer readable storage medium, wherein a computer program is stored thereon, and the computer program implements the steps of the method of claim 1.

6. An electronic device, comprising:

a memory, wherein a computer program is stored thereon; and a processor, configured to execute the computer program in the memory to implement the steps of the method of claim 1.

7. A target object detection method comprising:

identifying a target object based on first N frames of image data obtained within a current execution period, wherein N is a positive integer, and N is less than the total number of frames of image data that can be obtained within the current execution period; and if the target object is not identified, entering a sleep state until a termination of the current execution period;

wherein the target object detection method is periodically executed.

8. The method according to claim 7, wherein N=1.

9. The method according to claim 7, wherein a time length of the current execution period is determined in the following manner:

the greater a moving speed of a collection apparatus of the obtained image data is, the shorter the time length of the current execution period is.

10. The method according to claim 7, wherein the method is applied to an embedded platform.

11. A non-transitory computer readable storage medium, wherein a computer program is stored thereon, and the computer program implements the steps of a method according to claim 7 when being executed by a processor.

12. An electronic device, comprising:

a memory, wherein a computer program is stored thereon; and a processor, configured to execute the computer program in the memory to implement the steps of a method according to claim 7.

* * * * *